US011011952B2

United States Patent
Matsumoto et al.

(12) United States Patent
(10) Patent No.: US 11,011,952 B2
(45) Date of Patent: May 18, 2021

(54) MOTOR DRIVING DEVICE AND MOTOR DRIVING METHOD

(71) Applicant: FANUC CORPORATION, Yamanashi (JP)

(72) Inventors: Yasuyuki Matsumoto, Yamanashi (JP); Masaya Tateda, Yamanashi (JP); Keitarou Inagaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 133 days.

(21) Appl. No.: 16/402,271

(22) Filed: May 3, 2019

(65) Prior Publication Data

US 2019/0363600 A1    Nov. 28, 2019

(30) Foreign Application Priority Data

May 23, 2018    (JP) .............................. JP2018-098946

(51) Int. Cl.
| | |
|---|---|
| *H02K 3/42* | (2006.01) |
| *H02P 27/08* | (2006.01) |
| *H02P 5/46* | (2006.01) |
| *H02P 5/74* | (2006.01) |
| *H01B 9/02* | (2006.01) |

(52) U.S. Cl.
CPC ................. *H02K 3/42* (2013.01); *H02P 5/46* (2013.01); *H02P 5/74* (2013.01); *H02P 27/08* (2013.01); *H01B 9/026* (2013.01)

(58) Field of Classification Search
CPC ... H02K 3/42; H02P 27/08; H02P 5/46; H02P 5/74; H02P 29/50; H02P 27/085; H01B 9/026
See application file for complete search history.

(56) References Cited

FOREIGN PATENT DOCUMENTS

| JP | 2007-336634 A | 12/2007 |
| JP | 2008-109727 A | 5/2008 |
| JP | 2008109727 A | * 5/2008 |
| JP | 2012-222847 A | 11/2012 |

OTHER PUBLICATIONS

Machine Translation, Wakimoto, JP-2008109727-A, May 2008 (Year: 2008).*
An Office Action mailed by the Japanese Patent Office dated May 19, 2020, which corresponds to Japanese Patent Application No. 2018-098946 and is related to U.S. Appl. No. 16/402,271.

* cited by examiner

*Primary Examiner* — Thomas Truong
(74) *Attorney, Agent, or Firm* — Studebaker & Brackett PC (57) ABSTRACT

A motor driving device includes N units (N is a natural number equal to or greater than 2) of inverters configured to control N units of motors, respectively, a×N units (a is a natural number) of cables configured to allow connection between the N units of inverters and the N units of motors, respectively, and a PWM signal output unit configured to transmit a PWM signal to the N units of inverters. The N units of inverters and the a×N units of cables are divided into M groups (M≤N). The PWM signal output unit outputs the PWM signal for driving at least one inverter belonging to each group of the M groups so that the PWM signals have phase differences shifted by 360 degrees/M among the groups.

4 Claims, 4 Drawing Sheets

MOTOR DRIVING DEVICE AND MOTOR DRIVING METHOD

This application is based on and claims the benefit of priority from Japanese Patent Application No. 2018-098946, filed on 23 May 2018, the content of which is incorporated herein by reference.

BACKGROUND OF THE INVENTION

Field of the Invention

The present invention relates to a motor driving device and a motor driving method.

Related Art

As a motor driving device, for example, Patent Document 1 discloses a multi-axis driving system for driving a plurality of motors by a plurality of inverter type driving means for performing switching operation based on a carrier signal for PWM (pulse width modulation). In the case where the inverter type driving means drive the motors, the rapid change of voltage due to the switching operation causes such a phenomenon that a high frequency leakage current flows in a grounding line (a motor case) through a stray capacitance of a motor winding thereof. In order to suppress such a high frequency leakage current, the multi-axis driving system disclosed in Patent Document 1 has a first group of the inverter type driving means and a second group of the inverter type driving means and supplies the first group of the inverter type driving means with a first PWM carrier signal, and the second group of the inverter type driving means with a second PWM carrier signal which is synchronized with the first PWM carrier signal and has a phase difference shifted by 180 degrees from the first PWM carrier signal.

Patent Document 1: Japanese Unexamined Patent Application, Publication No. 2007-336634

SUMMARY OF THE INVENTION

The stray capacitances through which high frequency leakage currents flow may vary depending on the plurality of motors in some cases. The stray capacitances of the cables for connecting the inverter type driving means and the motors may also vary depending on the cables in some cases. Therefore, due to such a variety of stray capacitances, the high frequency leakage current may not be sufficiently suppressed in some cases.

(1) A motor driving device according to one aspect of the present disclosure includes N units (N is a natural number equal to or greater than 2) of motors, N units of inverters configured to control the N units of motors, respectively, a×N units (a is a natural number) of cables configured to allow connection between the N units of inverters and the N units of motors, respectively, and a PWM signal output unit configured to transmit a PWM signal to the N units of inverters.

The N units of motors, the N units of inverters, and the a×N units of cables are divided into M groups (M is a natural number equal to or less than N and equal to or greater than 2). The PWM signal output unit outputs the PWM signal for driving at least one inverter belonging to each group of the M groups so that the PWM signals have phase differences shifted by 360 degrees/M among the groups.

(2) A motor driving method according to another aspect of the present disclosure controls a motor driving device including N units (N is a natural number equal to or greater than 2) of motors, N units of inverters configured to control the N units (N is a natural number equal to or greater than 2) of motors, respectively, and a×N units (a is a natural number) of cables configured to allow connection between the N units of inverters and the N units of motors, respectively. The motor driving method includes the step of dividing the N units of inverters and the a×N units of cables into M groups (M is a natural number is equal to or less than N and equal to or greater than 2). The PWM signals each for driving at least one inverter belonging to each group of the M groups have phase differences shifted by 360 degrees/M among the groups.

Each aspect of the present disclosure enables to suppress a high frequency leakage current by canceling high frequency leakage currents among groups.

DETAILED DESCRIPTION OF THE INVENTION

Figure 1:
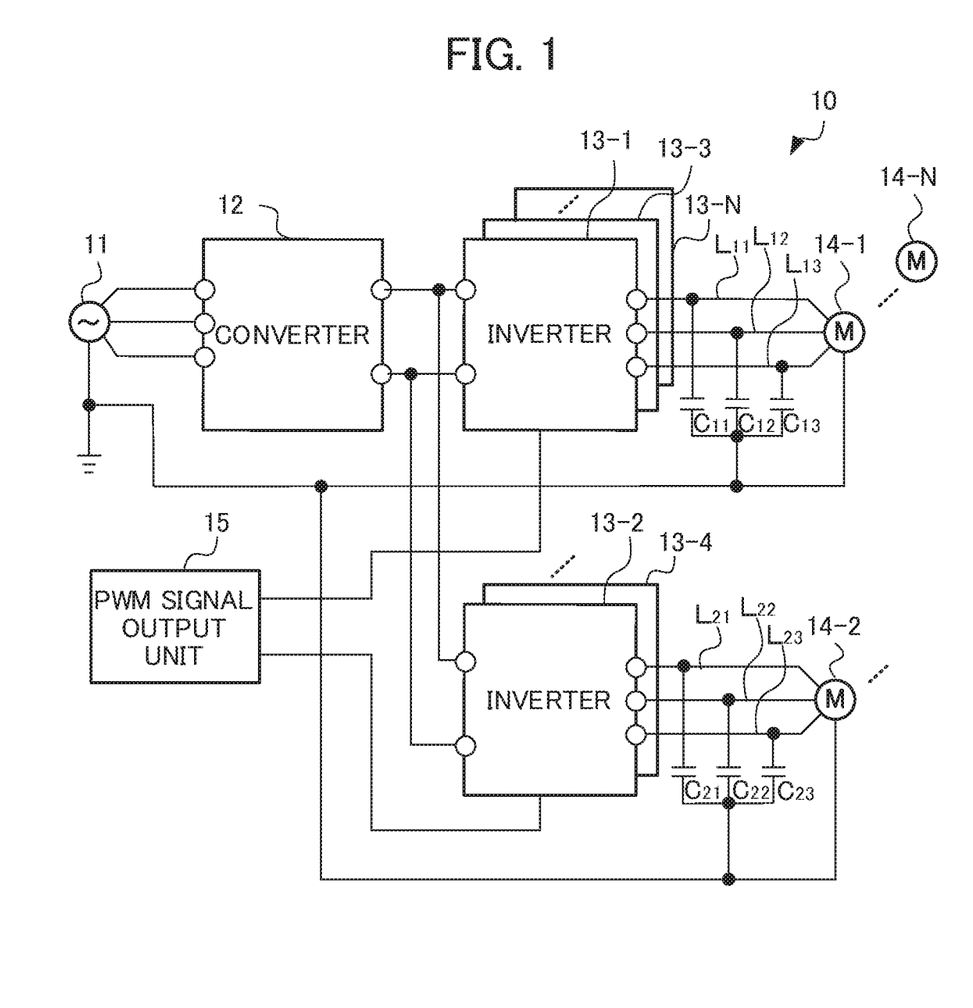
FIG. 1 is a configuration diagram illustrating a motor driving device according to one embodiment.
Figure 2:
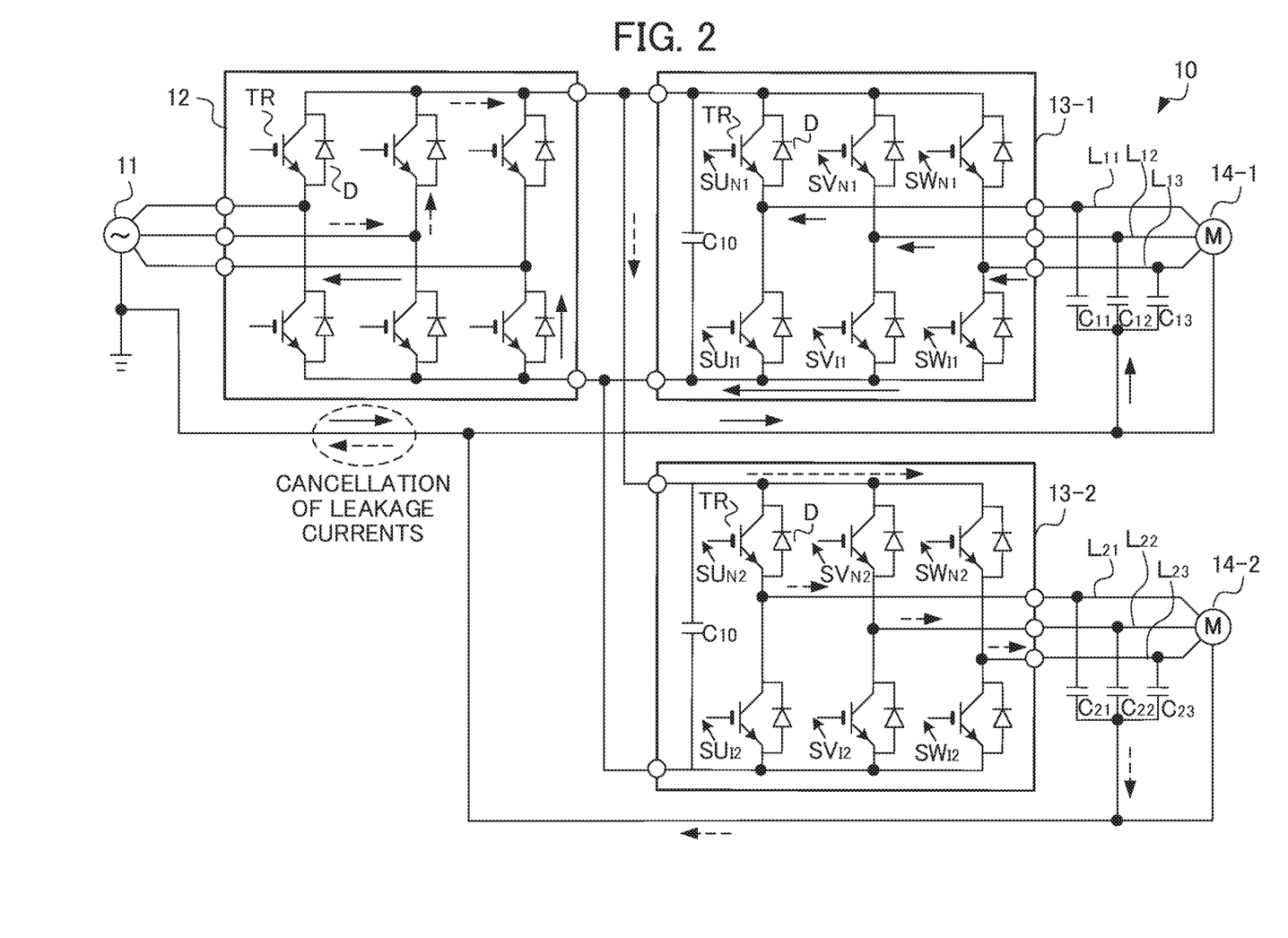
FIG. 2 is a configuration diagram illustrating the detailed configurations of a converter and inverter of the motor driving device shown in FIG. 1.
Figure 3:
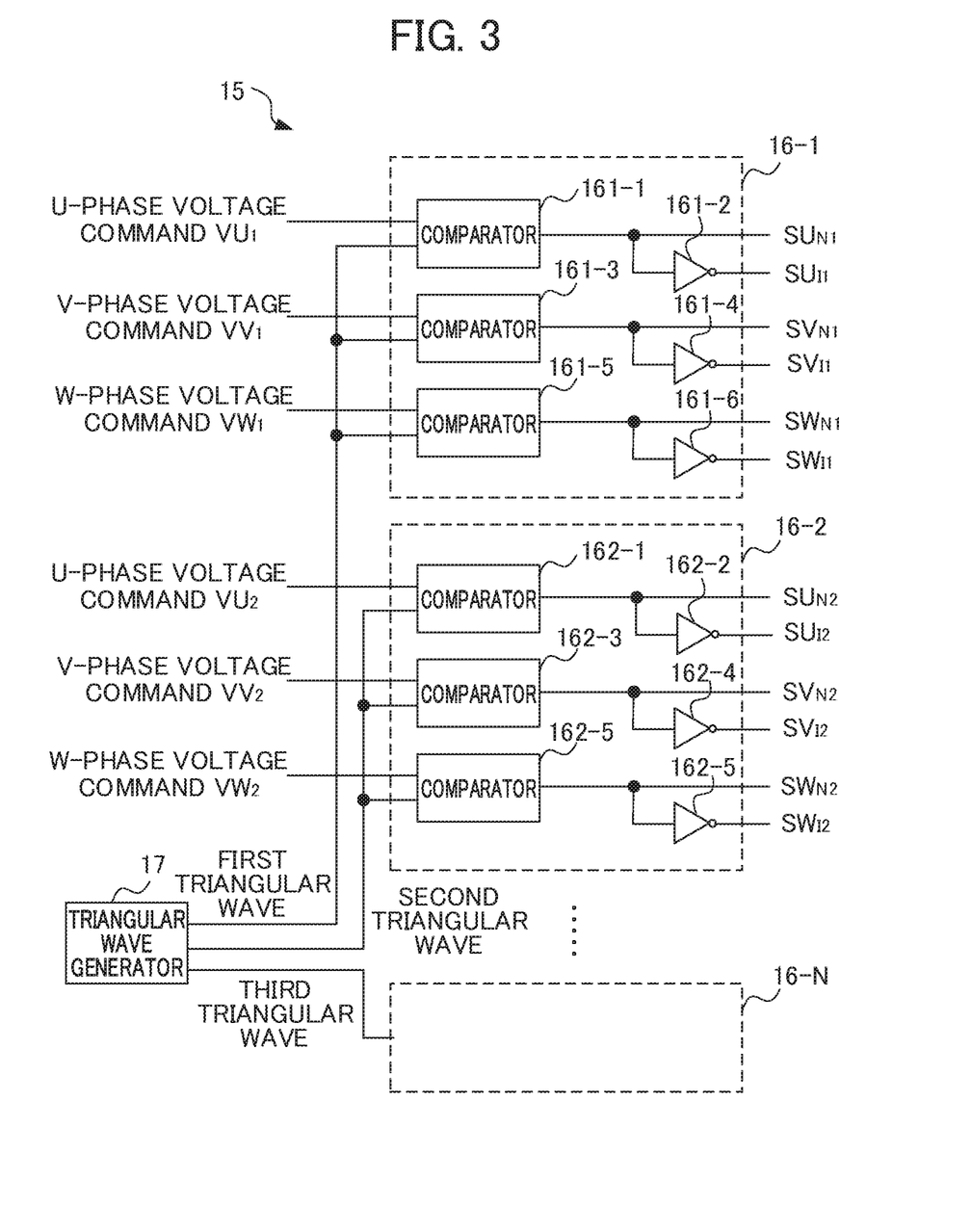
FIG. 3 is a configuration diagram illustrating the configuration of a PWM signal output unit of the motor driving device shown in FIG. 1.

An embodiment according to the present disclosure will be described below in detail with reference to the drawings. FIG. 1 is a configuration diagram illustrating a motor driving device according to one embodiment of the present disclosure. FIG. 2 is a configuration diagram illustrating the detailed configurations of a converter and inverter of the motor driving device shown in FIG. 1. FIG. 3 is a configuration diagram illustrating the configuration of a PWM signal output unit of the motor driving device shown in FIG. 1. A motor driving device 10 shown in FIG. 1 drives a motor of, for example, a machine tool, a robot, or an industrial machine.

The motor driving device 10 includes an AC power source 11, a converter 12, N units (N is a natural number equal to or greater than 2) of inverters 13-1 to 13-N, N units of motors 14-1 to 14-N, cables $L_{11}$ to $L_{13}$ respectively to cables $L_{N1}$ to $L_{N3}$ for connecting the respective inverters 13-1 to 13-N and the motors 14-1 to 14-N, and a PWM signal output unit 15. The inverters 13-1 to 13-N are disposed so as to correspond to the respective motors 14-1 to 14-N, and the number of the inverters is identical to the number of the motors. It is noted that although five units or more of the inverters are illustrated in FIG. 1, at least two units of the inverters may be disposed. Only the cables $L_{11}$ to $L_{13}$ and a cable $L_{21}$ to a cable $L_{23}$ are illustrated in FIG. 1. Each of the motors 14-1 to 14-N is a three-phase motor, and thus one motor and one inverter are connected by four cables respectively for U-phase, V-phase, W-phase, and GND. The number of the cables for connecting N units of inverters and N units of motors is expressed by a×N (a is a natural number). In the case of three-phase motors, the total number of the four cables for U-phase, V-phase, W-phase, and GND are 4×N (a=4). In FIG. 1, the cables $L_{11}$ to $L_{13}$ correspond to the three cables respectively for U-phase, V-phase, and W-phase for connecting the inverter 13-1 and the motor 14-1, while the cables $L_{21}$ to $L_{23}$ correspond to the three cables respectively for U-phase, V-phase, and W-phase for connecting the inverter 13-2 and the motor 14-2.

Each of the motors 14-1 to 14-N has a stray capacitance. Each of the cables $L_{11}$ to $L_{13}$ respectively to $L_{N1}$ to $L_{N3}$, which connects the inverters 13-1 to 13-N and the motors 14-1 to 14-N, also has a stray capacitance. In FIG. 1, a stray capacitance $C_{11}$, a capacitance $C_{12}$, and a capacitance $C_{13}$ respectively correspond to the stray capacitances obtained by adding the stray capacitance of the motor 14-1 to the stray capacitances of the U-phase cable, the V-phase cable, and the W-phase cable for connecting the inverter 13-1 and the motor 14-1. A stray capacitance $C_{21}$, a stray capacitance $C_{22}$ and a stray capacitance $C_{23}$ respectively correspond to the stray capacitances obtained by adding the stray capacitance of the motor 14-2 to the stray capacitances of the U-phase cable, the V-phase cable, and the W-phase cable for connecting the inverter 13-2 and the motor 14-2. A stray capacitance of a motor is formed, for example, between a motor winding and a frame. A stray capacitance of a cable is formed, for example, between the cable and a power cable, and between the cable and the ground.

The three-phase AC power (U-phase, V-phase, W-phase, and GND) supplied by the AC power source 11 is converted to DC power by the converter 12. The DC power is converted into three-phase AC power by the inverters 13-1 to 13-N. The motors 14-1 to 14-N are driven by the AC power output by the inverters 13-1 to 13-N. When each of the motors 14-1 to 14-N is decelerated, the three-phase AC power generated by each of the motors is converted from AC power to DC power by each of the inverters 13-1 to 13-N. The DC power is input to the converter 12, converted into three-phase AC power by the converter 12, and thereafter input to the AC power source 11.

As shown in FIG. 2, in the converter 12, the constituent units each including a transistor TR and a diode D connected in parallel to the transistor TR are arranged in two rows and three columns. In each column, one main terminal (for example, an emitter terminal) of the transistor TR in the upper row is connected to another main terminal (for example, a collector terminal) of the transistor TR in the lower row. The U-phase AC power supplied by the AC power source 11 is output to the connected portion between the main terminals of the two transistors TR in the first column of the converter 12. The V-phase AC power supplied by the AC power source 11 is output to the connected portion between the main terminals of the two transistors TR in the second column of the converter 12. The W-phase AC power supplied by the AC power source 11 is output to the connected portion between the main terminals of the two transistors TR in the third column of the converter 12.

The inverters 13-1 to 13-N have the same configuration. For the sake of simplification, FIG. 2 shows only the configurations of the inverters 13-1 and 13-2. Only the configurations and operations of the inverters 13-1 and 13-2 will be described below. A capacitor $C_1$ is disposed on the input side to be connected to the converter 12 in the inverter 13-1. The capacitor $C_1$ functions as a smoothing capacitor for suppressing a pulsating component of the DC power and an accumulation capacitor for accumulating a DC voltage. In the inverter 13-1, the constituent units each including the transistor TR and the diode D connected in parallel to the transistor TR are arranged in two rows and three columns. In each column, one main terminal (for example, an emitter terminal) of the transistor TR in the upper row is connected to another main terminal (for example, a collector terminal) of the transistor TR in the lower row. A signal $SU_{N1}$, a signal $SV_{N1}$, and a signal $SW_{N1}$, and an inversion signal $SU_{f1}$, an inversion signal $SV_{f1}$ and an inversion signal $SW_{f1}$ are supplied by the PWM signal output unit 15 to the control terminals (for example, base terminals) of the transistors TR arranged in two rows and three columns of the inverter 13-1 shown in FIG. 2. The inversion signals $SU_{f1}$, $SV_{f1}$, $SW_{f1}$ correspond to the inversion signals of the signals $SU_{N1}$, $SV_{N1}$, $SW_{N1}$. The signals $SU_{N1}$, $SV_{N1}$, $SW_{N1}$ and the corresponding inversion signals $SU_{f1}$, $SV_{f1}$, $SW_{f1}$ constitute PWM signals.

The U-phase AC power is output from the connected portion between the main terminals of the two transistors TR arranged in the first column of the inverter 13-1 to the motor 14-1. The V-phase AC power is output from the connected portion between the main terminals of the two transistors TR arranged in the second column of the inverter 13-1 to the motor 14-1. The W-phase AC power is output from the connected portion between the main terminals of the two transistors TR arranged in the third column of the inverter 13-1 to the motor 14-1.

A capacitor $C_2$ is disposed on the input side to be connected to the converter 12 in the inverter 13-2. The capacitor $C_2$ functions as a smoothing capacitor for suppressing a pulsating component of the DC power and an accumulation capacitor for accumulating a DC voltage. In the inverter 13-2, the constituent units each including the transistor TR and the diode D connected in parallel to the transistor TR are arranged in two rows and three columns. In each column, one main terminal (for example, an emitter terminal) of the transistor TR in the upper row is connected to another main terminal (for example, a collector terminal) of the transistor TR in the lower row. A signal $SU_{N2}$, a signal $SV_{N2}$, and a signal $SW_{N2}$, and an inversion signal $SU_{f2}$, an inversion signal $SV_{f2}$ and an inversion signal $SW_{f2}$ are supplied by the PWM signal output unit 15 to the control terminals (for example, base terminals) of the transistors TR arranged in two rows and three columns of the inverter 13-2 shown in FIG. 2. The inversion signals $SU_{f2}$, $SV_{f2}$, $SW_{f2}$ correspond to the inversion signals of the signals $SU_{N2}$, $SV_{N2}$, $SW_{N2}$. The signals $SU_{N2}$, $SV_{k2}$, $SW_{N2}$ and the corresponding inversion signals $SU_{f2}$, $SV_{f2}$, $SW_{f2}$ constitute PWM signals.

The U-phase AC power is output from the connected portion between the main terminals of the two transistors TR arranged in the first column of the inverter 13-2 to the motor 14-2. The V-phase AC power is output from the connected portion between the main terminals of the two transistors TR arranged in the second column of the inverter 13-2 to the motor 14-2. The W-phase AC power is output from the connected portion between the main terminals of the two transistors TR arranged in the third column of the inverter 13-2 to the motor 14-2.

As shown in FIG. 3, the PWM signal output unit 15 includes a PWM control unit 16-1 to a PWM control unit 16-N for respectively transmitting PWN signals to the inverters 13-1 to 13-N, and a triangular wave generator 17 for transmitting a first triangular wave to an Nth triangular wave to the PWM control units 16-1 to 16-N, respectively. As for the inverters 13-1 to 13-N and the cables $L_{11}$ to $L_{13}$ respectively to $L_{N1}$ to $L_{N3}$ for connecting the respective inverters 13-1 to 13-N and the motors 14-1 to 14-N, which are shown in FIG. 1, an operator calculates added stray capacitances by adding the stray capacitances of the respective motors 14-1 to 14-N to the stray capacitances of the three-phase cables for connecting the respective motors and the inverters. The motors 14-1 to 14-N, the inverters 13-1 to 13-N, and the cables $L_{11}$ to $L_{13}$ respectively to $L_{N1}$ to $L_{N3}$ are divided into M groups (M is a natural number is equal to or less than N and equal to or greater than 2) so that the stray capacitances are equal among the groups. In the case of N=2, for example, an operator calculates an added stray capacitance $C_1$ ($C_1=C_{11}+C_{12}+C_{13}$) of the motor 14-1 and the cables $L_{11}$ to $L_{13}$, and further calculates an added stray capacitance $C_2$ ($C_2=C_{21}+C_{22}+C_{23}$) of the motor 14-2 and the cables $L_{21}$ to $L_{23}$. In the case where the added stray capacitance $C_1$ is equal to the added stray capacitance $C_2$, two groups (M=2) are formed, including the group including the motor 14-1, the inverter 13-1, and the cables $L_{11}$ to $L_{13}$, and the group including the motor 14-2, the inverter 13-2, and the cables $L_{21}$ to $L_{23}$. In this case, the added stray capacitance $C_1$ and the added stray capacitance $C_2$ are treated as the stray capacitances of the groups, respectively.

In the case of N=4 as another example, an operator calculates the added stray capacitance $C_1$ ($C_1=C_{11}+C_{12}+C_{13}$) of the motor 14-1 and the cables $L_{11}$ to $L_{13}$, and further calculates an added stray capacitance $C_3$ ($C_3=C_{31}+C_{32}+C_{33}$) of the motor 14-3 and the cables $L_{31}$ to $L_{33}$. The operator further calculates the added stray capacitance $C_2$ ($C_2=C_{21}+C_{22}+C_{23}$) of the motor 14-2 and the cables $L_{21}$ to $L_{23}$, and an added stray capacitance $C_4$ ($C_4=C_{41}+C_{42}+C_{43}$) of the motor 14-4 and the cables $L_{41}$ to $L_{43}$. In the case where the sum of the stray capacitances ($C_1+C_3$) is equal to the sum of the stray capacitances ($C_2+C_4$), two groups (M=2) including a first group and a second group are formed. The first group includes the motor 14-1, the inverter 13-1, and the cables $L_{11}$ to $L_{13}$, and the motor 14-3, the inverter 13-3, and the cables $L_{31}$ to $L_{33}$. The second group includes the motor 14-2, the inverter 13-2, and the cables $L_{21}$ to $L_{23}$, and the motor 14-4, the inverter 13-4, and the cables $L_{41}$ to $L_{43}$. In this case, the sum of the stray capacitances ($C_1+C_3$) and the sum of the stray capacitances ($C_2+C_4$) are treated as the stray capacitances of the groups, respectively. It is noted that the state of the stray capacitances being equal includes not only the state of being completely identical, but also the state in which a difference between the stray capacitances is in a specified range (for example, one stray capacitance is 10% greater or less compared to the other stray capacitance).

In the case where M groups having the same stray capacitance are formed, the triangular wave generator 17 outputs triangular waves having phase differences shifted by 360 degrees/M among the groups to the PWM control units corresponding to the inverters of each group of the M groups. In an example of the case where the number of the groups having the same stray capacitance is two (M=2), the triangular wave generator 17 outputs triangular waves having phase differences shifted by 180 degrees between the groups to the PWM control units corresponding to the inverters in each group of the two groups. In the case where the number of the groups having the same stray capacitance is three (M=3), the triangular wave generator 17 outputs triangular waves having phase differences shifted by 120 degrees among the groups to the PWM control units corresponding to the inverters in each group of the three groups.

The case of N=2 and M=2, for example, is described below. It is supposed that the added stray capacitance $C_1$ ($C_1=C_{11}+C_{12}+C_3$) is equal to the added stray capacitance $C_2$ ($C_2=C_{21}+C_{22}+C_{23}$) and that the first group includes the motor 14-1, the inverter 13-1, and the cables $L_{11}$ to $L_{13}$, while the second group includes the motor 14-2, the inverter 13-2, and the cables $L_{21}$ to $L_{23}$. The PWM control unit 16-1 corresponds to the inverter 13-1 of the first group, and the PWM control unit 16-2 corresponds to the inverter 13-2 of the second group. The triangular wave generator 17 outputs a first triangular wave, and a second triangular wave having a phase difference shifted by 180 degrees from the first triangular wave to the PWM control units 16-1, 16-2, respectively.

Figure 4:
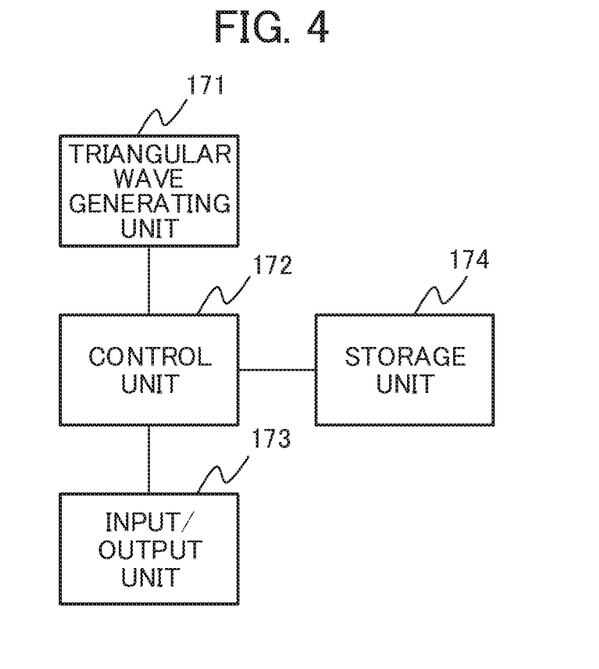
FIG. 4 is a block diagram illustrating a configuration example of a triangular wave generator.

As shown in FIG. 4, the triangular wave generator 17 includes a triangular wave generating unit 171, a control unit 172, an input/output unit 173, and a storage unit 174. The storage unit 174 stores a table indicating the names of the groups having the same stray capacitance, the names of the PWM control units belonging to respective groups, the names of the inverters belonging to respective groups, and the names of the motors belonging to respective groups. Table 1 indicates the table of the case of N=2 and M=2. In Table 1, the stray capacitances of the first group and the second group are equal to each other. A first PWM control unit and a second PWM control unit correspond to the PWM control units 16-1, 16-2, respectively. A first inverter and a second inverter correspond to the inverters 13-1, 13-2, respectively. A first motor and a second motor correspond to the motors 14-1, 14-2, respectively.

TABLE 1

| GROUP NAME | NAME OF PWM CONTROL UNIT | NAME OF INVERTER | NAME OF MOTOR |
|---|---|---|---|
| FIRST GROUP | FIRST PWM CONTROL UNIT | FIRST INVERTER | FIRST MOTOR |
| SECOND GROUP | SECOND PWM CONTROL UNIT | SECOND INVERTER | SECOND MOTOR |

Table 2 indicates the table of the case of N=4 and M=2. Also in Table 2, the stray capacitances of the first group and the second group are equal to each other. In the first group, the first PWM control unit and a third PWM control unit correspond to the PWM control units 16-1, 16-3, respectively. The first inverter and a third inverter correspond to the inverters 13-1, 13-3, respectively. The first motor and a third motor correspond to the motors 14-1, 14-3, respectively. In the second group, the second PWM control unit and a fourth PWM control unit correspond to the PWM control units 16-2, 16-4, respectively. The second inverter and a fourth inverter correspond to the inverters 13-2, 13-4, respectively. The second motor and a fourth motor correspond to the motors 14-2, 14-4, respectively.

TABLE 2

| GROUP NAME | NAME OF PWM CONTROL UNIT | NAME OF INVERTER | NAME OF MOTOR |
|---|---|---|---|
| FIRST GROUP | FIRST PWM CONTROL UNIT | FIRST INVERTER | FIRST MOTOR |
|  | THIRD PWM CONTROL UNIT | THIRD INVERTER | THIRD MOTOR |
| SECOND GROUP | SECOND PWM CONTROL UNIT | SECOND INVERTER | SECOND MOTOR |
|  | FOURTH PWM CONTROL UNIT | FOURTH INVERTER | FOURTH MOTOR |

The tables stored in the storage unit 174 are prepared on the basis of the information input by an operator. An operator estimates the stray capacitances of the motors 14-1 to 14-N and the stray capacitances of the cables $L_{11}$ to $L_{13}$ respectively to $L_{N1}$ to $L_{N3}$ for connecting the respective inverters 13-1 to 13-N and the motors 14-1 to 14-N. The motors 14-1 to 14-N, the inverters 13-1 to 13-N, and the cables $L_{11}$ to $L_{13}$ respectively to $L_{N1}$ to $L_{N3}$ are divided into M groups (M is a natural number is equal to or less than N and equal to or greater than 2) so that the stray capacitances are equal among the groups. The operation of the PWM signal output unit 15 is described below, by use of the case of N=2 and M=2 as an example. An operator is supposed to estimate that the added stray capacitance obtained by adding the stray capacitance of the motor 14-1 to the stray capacitances of the cables $L_{11}$ to $L_{13}$ is equal to the added stray capacitance obtained by adding the stray capacitance of the motor 14-2 to the stray capacitances of the cables $L_{21}$ to $L_{23}$. The operator inputs at least one of the information for specifying the inverters 13-1, 13-2 and the information for specifying the motors 14-1, 14-2 into the triangular wave generator 17 via the input/output unit 173.

The control unit 172 specifies the PWM control units with respect to the same added stray capacitance on the basis of the at least one of the information for specifying the inverters 13-1, 13-2 and the information for specifying the motors 14-1, 14-2, and stores Table 1 indicating the groups having the same added stray capacitance as the first group and the second group in the storage unit 174. Table 1 indicates the case where the information on the inverters 13-1, 13-2 and the information on the motors 14-1, 14-2 are both input into the triangular wave generator 17. The control unit 172 controls the triangular wave generating unit 171 by referring to the table of Table 1 stored in the storage unit 174, during the operation of the motor driving device, to output the first triangular wave and the second triangular wave having phase differences shifted by 180 degrees from each other to the PWM control units 16-1, 16-2, respectively.

As shown in FIG. 3, the PWM control unit 16-1 includes a comparator 161-1, a comparator 161-3 and a comparator 161-5, and a NOT circuit 161-2, a NOT circuit 161-4 and a NOT circuit 161-6 respectively for inverting the outputs of the comparators 161-1, 161-3, 161-5. The triangular wave generator 17 inputs the first triangular wave into each of the comparators 161-1, 161-3, 161-5. The comparator 161-1 receives a U-phase voltage command $VU_1$. The comparator 161-3 receives a V-phase voltage command $VV_1$. The comparator 161-5 receives a W-phase voltage command $VW_1$.

The comparator 161-1 compares the first triangular wave and the U-phase voltage command $VU_1$, and outputs the signal $SU_{N1}$ to the inverter 13-1 and the NOT circuit 161-2. The NOT circuit 161-2 outputs the inversion signal $SU_{f1}$ to the inverter 13-1. The comparator 161-3 compares the first triangular wave and the V-phase voltage command $VV_1$, and outputs the signal $SV_{N1}$ to the inverter 13-1 and the NOT circuit 161-4. The NOT circuit 161-4 outputs the inversion signal $SV_{f1}$ to the inverter 13-1. The comparator 161-5 compares the first triangular wave and the W-phase voltage command $VW_1$, and outputs the signal $SW_{N1}$ to the inverter 13-1 and the NOT circuit 161-6. The NOT circuit 161-6 outputs the inversion signal $SW_{f1}$ to the inverter 13-1.

The PWM control unit 16-2, which has the same configuration as the PWM control unit 16-1, has a comparator 162-1, a comparator 162-3 and a comparator 162-5, and a NOT circuit 162-2, a NOT circuit 162-4 and a NOT circuit 162-6 respectively for inverting the outputs of the comparators 162-1, 162-3, 162-5. The triangular wave generator 17 inputs the second triangular wave into each of the comparators 162-1, 162-3, 162-5. The comparator 162-2 receives a U-phase voltage command $VU_2$. The comparator 162-3 receives a V-phase voltage command $VV_2$. The comparator 162-5 receives a W-phase voltage command $VW_2$. The PWM control unit 16-2 outputs the signals $SU_{N2}$, $SV_{N2}$, $SW_{N2}$ and the inversion signals $SU_{f2}$, $SV_{f2}$, $SW_{f2}$ to the inverter 13-2, by the same operation as the PWM control unit 16-1.

The next description with reference to FIG. 2 is about the operation of the motor driving device 10. The case of N=2 and M=2 is described below as an example. That is, it is supposed that the groups having the same stray capacitance between the groups are the first group and the second group, and that the signals and the inversion signals to be input by the PWM control unit 16-2 into the inverter 13-2 have the phase differences shifted by 180 degrees from the signals and inversion signals to be input by the PWM control unit 16-1 into the inverter 13-1.

The control unit 172 controls the triangular wave generating unit 171 by referring to the table of Table 1 stored in the storage unit 174, during the operation of the motor driving device, to output the first triangular wave and the second triangular wave having phase differences shifted by 180 degrees from each other to the PWM control units 16-1, 16-2, respectively. In the state shown in FIG. 2, an AC current flows via the three transistors TR in the second row of the inverter 13-1 by the inversion signals $SU_{f1}$, $SV_{f1}$, $SW_{f1}$ input by the PWM control unit 16-1 into the inverter 13-1, and a leakage current (indicated by solid line arrows in FIG. 2) flows from a grounding line via the stray capacitances $C_{11}$, $C_{12}$, $C_{13}$. An AC current flows via the three transistors TR in the first row of the inverter 13-2 by the signals $SU_{N2}$, $SV_{N2}$, $SW_{N2}$ input by the PWM control unit 16-2 into the inverter 13-2, and a leakage current (indicated by dotted line arrows in FIG. 2) flows to the grounding line via the stray capacitances $C_{21}$, $C_{22}$, $C_{23}$. In this way, the triangular waves are output, which have the phase differences shifted by 180 degrees from each other as described above in the first group and the second group in which the stray capacitances are equal to each other. Accordingly, the leakage currents flowing in the grounding line are canceled, resulting in that a high frequency leakage current is suppressed.

The case of N=2 and M=2 has been described so far. The value N may be appropriately set according to the configuration of the motor driving device, and the number M of the groups may be set to any number as long as the stray capacitances are made equal among the groups. For example, in the motor driving device with N=6, the number M may be set to 2 or 3 as long as the stray capacitances are made equal among the groups.

The above-described PWM control unit is enabled to be realized by hardware, software, or a combination of these. The PWM control method to be performed by the cooperation of the respective components included in the above-described PWM control unit is also enabled to be realized by hardware, software, or a combination of these. The description of "being realized by software" means the case of being realized when a computer reads and executes a program. In the case of being realized by the cooperation of hardware and software, the PWM control unit includes an arithmetic processing unit such as a CPU (Central Processing Unit). The PWM control unit includes an auxiliary storage device such as an HDD (Hard Disk Drive) for storing various types of control programs such as application software and OS (Operating System) and a main storage device such as a RAM (Random Access Memory) for storing data temporarily required by the arithmetic processing unit in executing such programs.

In the PWM control unit, the arithmetic processing unit reads application software or OS from the auxiliary storage device, develops the read application software or the OS in the main storage device, and performs arithmetic processing based on the application software or the OS. Various types of hardware included in each device are controlled on the basis of the arithmetic processing result. In this way, the present embodiment is enabled to be realized by the cooperation of hardware and software.

Programs are stored by use of various types of non-transitory computer readable media, and are able to be supplied to a computer. Non-transitory computer readable media include various types of tangible storage media. Examples of the non-transitory computer readable media include: a magnetic recording medium (e.g. hard disk drive); a magneto-optical recording medium (e.g. magneto-optical disk); CD-ROM (Read Only Memory); CD-R; CD-R/W; and semiconductor memory (e.g. Mask ROM, PROM (Programmable ROM), EPROM (Erasable PROM), flash ROM, and RAM (Random Access Memory)).

Figure 5:
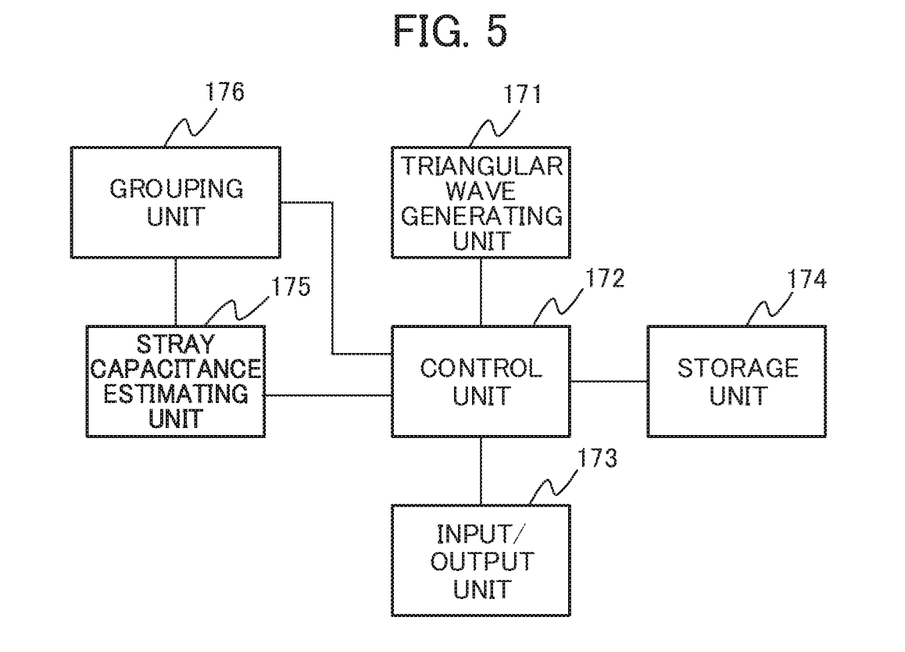
FIG. 5 is a block diagram illustrating another configuration example of the triangular wave generator.

The above-described embodiment is a preferred embodiment of the present invention. However, the scope of the present invention is not limited only to the above-described embodiment. Various modifications are available without deviating from the gist of the present invention. For example, as shown in FIG. 5, the triangular wave generator 17 may include a stray capacitance estimating unit 175 and a grouping unit 176, in addition to the triangular wave generating unit 171, the control unit 172, the input/output unit 173, and the storage unit 174. In this case, the stray capacitance estimating unit 175 calculates the added stray capacitances obtained by adding the stray capacitances of the motors 14-1 to 14-N to the stray capacitances of the cables for connecting the inverters 13-1 to 13-N and the motors 14-1 to 14-N, on the basis of the model names of the motors, the lengths and types of the cables input by an operator, and the like. The grouping unit 176 obtains the groups having the same stray capacitance on the basis of the added stray capacitances calculated by the stray capacitance estimating unit 175 and prepares a table as with the table of Table 1 or Table 2. The control unit 172 stores the prepared table in the storage unit 174. In the above-described embodiment, components are divided into M groups so that the stray capacitances are made equal among the groups. However, the present invention is not limited thereto. Such grouping may be performed by any method for allowing the cancellation of high frequency leakage currents among the groups.

<Modification in which the PWM Control Unit is Provided Separately from the Motor Control Device>

In the embodiment described above, the PWM control unit is configured so as to be included in the motor driving device. An PWM control device having some or all of the functions of the PWM control unit may be provided separately from the motor driving device.

EXPLANATION OF REFERENCE NUMERALS

11 AC POWER SOURCE
12 CONVERTER
13-1 to 13-N INVERTER
14-1 to 14-N MOTOR
15 PWM SIGNAL OUTPUT UNIT
16-1 to 16-N PWM CONTROL UNIT
17 TRIANGULAR WAVE GENERATOR

What is claimed is:

1. A motor driving device comprising:
   N units of motors, the N being a natural number equal to or greater than 2;
   N units of inverters configured to control the N units of motors, respectively;
   a×N units of cables configured to allow connection between the N units of inverters and the N units of motors, respectively, the a being a natural number;
   a PWM signal output unit configured to transmit a PWM signal to the N units of inverters,
   a stray capacitance estimating unit configured to calculate added stray capacitances obtained by adding each stray capacitance of the N units of motors and each stray capacitance of the a×N units of cables, at least based on information on the N units of motors and information on the a×N units of cables; and
   a grouping unit configured to obtain M groups having an identical stray capacitance, based on the added stray capacitances calculated by the stray capacitance estimating unit, and prepare a table indicating a combination of at least motors and inverters included in each of the M groups, wherein M is a natural number equal to or less than N and equal to or greater than 2, wherein
   the PWM signal output unit outputs the PWM signal for driving at least one inverter belonging to each group of the M groups so that the PWM signals have phase differences shifted by 360 degrees/M among the groups, based on the table.

2. The motor driving device according to claim 1, wherein
   the PWM signal output unit includes M units of PWM control units each configured to output the PWM signal to the at least one inverter in each group of the M groups, and a triangular wave generator configured to output triangular waves having phase differences shifted by 360 degrees/M to the M units of PWM control units, and
   the M units of PWM control units output the PWM signals having phase differences shifted by 360 degrees/M on a basis of the triangular waves.

3. The motor driving device according to claim 1, wherein the motors are three-phase motors.

4. A motor driving method for controlling a motor driving device, the motor driving device comprising:
- N units of motors, the N being a natural number equal to or greater than 2;
- N units of inverters configured to control the N units of motors, respectively, the N being a natural number equal to or greater than 2; and
- a×N units of cables configured to allow connection between the N units of inverters and the N units of motors, respectively, the a being a natural number, the motor driving method comprising a step of:
- calculating added stray capacitances obtained by adding each stray capacitance of the N units of motors and each stray capacitance of the a×N units of cables, at least based on information on the N units of motors and information on the a×N units of cables; and
- obtaining M groups having an identical stray capacitance, based on the added stray capacitances calculated, and preparing a table indicating a combination of at least motors and inverters included in each of the M groups, wherein M is a natural number equal to or less than N and equal to or greater than 2, wherein
- PWM signals each for driving at least one inverter belonging to each group of the M groups have phase differences shifted by 360 degrees/M among the groups, based on the table.

* * * * *